(12) United States Patent
Abbey et al.

(10) Patent No.: US 8,233,412 B1
(45) Date of Patent: Jul. 31, 2012

(54) MULTI-SIGNAL, SOFTWARE-DEFINED AND STARING COGNITIVE COMMUNICATIONS SYSTEM

(75) Inventors: Duane L. Abbey, Cedar Rapids, IA (US); Mark K. Yu, Coralville, IA (US); Haluk Sasmazer, West Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 283 days.

(21) Appl. No.: 12/826,908

(22) Filed: Jun. 30, 2010

(51) Int. Cl.
*H04B 1/56* (2006.01)

(52) U.S. Cl. ......... 370/276; 370/210; 370/338; 370/256

(58) Field of Classification Search .................. None
See application file for complete search history.

(56) References Cited

U.S. PATENT DOCUMENTS

| | | | |
|---|---|---|---|
| 5,919,548 A | 7/1999 | Barron | |
| 5,998,298 A | 12/1999 | Fleming | |
| 6,031,454 A | 2/2000 | Lovejoy | |
| 6,301,965 B1 | 10/2001 | Chu | |
| 6,373,418 B1 | 4/2002 | Abbey | |
| 6,587,060 B1 | 7/2003 | Abbey | |
| 6,808,952 B1 | 10/2004 | Sniegowski | |
| 7,004,198 B1 | 2/2006 | Okandan | |
| 7,335,972 B2 | 2/2008 | Chanchani | |
| 7,385,334 B1 | 6/2008 | Olsson | |
| 7,616,077 B1 | 11/2009 | Wittwer | |
| 2010/0080312 A1 * | 4/2010 | Moffatt et al. ................ 375/260 |

* cited by examiner

*Primary Examiner* — Duc C Ho
(74) *Attorney, Agent, or Firm* — Donna P. Suchy; Daniel M. Barbieri

(57) ABSTRACT

The integrated, multiple independent, simultaneous signal software defined radio system architecture of this invention is suitable for many new very-low latency, software defined radio applications, both cognitive and conventional, including: communications networks, electronic warfare, surveillance and radar. The system supports multiple operations, locally controlled or remotely controlled, with simultaneous signals prosecutions and anti-jam system-to-system networking. New cognitive waveforms are defined that simultaneously seek to maximize data throughput in arbitrary spectral environments, while normally avoiding interference with current and new arbitrary signal occurrences. The cognitive radio system has the capability to continuously receive and process all the ongoing signals present in a wideband frequency block, including the recognition/characterization of all signals and the recovery of multiple desired signals, and then rapidly respond by transmitting as appropriate, multi-carrier, modulated signals. The present invention uses massively-parallel fixed tuned receive channelization, along with massively parallel digital signal processing and software generated, multi-modulated RF signals, to provide a system that is fast enough to cognitively manage the ongoing operation of multiple signals, multiple frequencies, and multiple operations, all simultaneously.

21 Claims, 8 Drawing Sheets

Representative 256 Channelized AGC Pre-Processor

MULTI-SIGNAL, SOFTWARE-DEFINED AND STARING COGNITIVE COMMUNICATIONS SYSTEM

BACKGROUND OF THE INVENTION

1. Field of the Invention

The present invention relates generally to communication systems; and, more particularly to a software-defined and staring cognitive communications system.

2. Description of the Related Art

Modern RF communications are seeking highly adaptable, multi-waveform, multi-band, software defined radio (SDR) architectures, which require, for RF receivers, that RF signal processing needs to be performed with high capacity digital signal processors with greatly reduced signal acquisition times. Current radio architectures are mostly channelized with signal acquisition requiring a relatively slow frequency tuning and channel stabilization before signal recovery processing. Such conventional radio architectures do not have the necessary signal acquisition speed, adaptability, and processing bandwidths necessary to meet the needs of next generation SDR. As will be disclosed below, the present invention moves away from conventional tuned channelization architectures and involves a fixed tuned staring channelization architecture.

SUMMARY OF THE INVENTION

In a broad aspect, the present invention is a half-duplex, software-defined and staring cognitive communications system. The communications system includes a broadband antenna system. The broadband antenna system includes at least one broadband antenna; and, an antenna interface unit operatively connected to the broadband antenna. The antenna interface unit includes an isolation element operatively connected between a transmitter system and a staring receiver system for supporting short switch times between transmit and receive operations. A first RF harmonic filter bank is operatively connected to the isolation element for providing suppression of transmit signal set harmonics in the RF power output. A pre-select filter bank receives RF signals from the isolation element and separates and isolates frequency block sets for further signal pre-processing. A staring receiver system is operatively connected to the broadband antenna system for viewing and pre-processing input RF signals present in a plurality of channels at the same time. The staring receiver system includes at least one staring receiver subsystem. The staring receiver subsystem includes at least one block translator operatively switch connected to the pre-select filter bank for providing a frequency translation (down conversion) of a pre-selected frequency block; and, at least one parallel channelization, automated gain control (AGC) and signal detection pre-processor system. Each AGC and signal detection pre-processor system includes: 1) a fan-out element for replicating the input RF signals into a plurality of pre-process channels along an RF spectral block; 2) a plurality of pre-process channel miniature RF filters, aligned in parallel, for continuous frequency coverage along the RF spectral block, for separating and isolating a set of comparatively narrow frequency channels on a continuous basis; 3) a plurality of gain control elements for providing automatic channelized level control, under intelligent process control, of the isolated channels; 4) a plurality of RF signal detectors for receiving the isolated channels for detecting the presence of signals content, for further determining relative levels, center frequencies, and bandwidths; and, 5) a fan-in element for combining the plurality of level controlled, isolated channels to a common RF spectrum, thus providing a pre-processed receive RF output.

The staring receiver system also includes a set point summing amplifier for combining the pre-processed receive RF outputs and providing a combined output; and, a radio frequency-analog-to-digital converter (RF-ADC) for receiving the combined output and converting it to a digital output, wherein parallel channelization, automated gain control (AGC) and signal detection pre-processor system is configured to allow viewing and conversion of the plurality of channels on a substantially continuous basis without overloading the RF-ADC. A coordinated digital signal processing (DSP) array is operatively connected to the staring receiver system for providing digital signal processing of the receive and transmit signal sets, on a real-time basis, as well as management of the software defined and staring cognitive communications system from the digital domain.

A transmitter system is operatively connected to the DSP array and to the broadband antenna system, the transmitter system includes at least one transmitter subsystem. The transmitter subsystem includes a radio frequency-digital-to-analog converter (RF-DAC) for receiving at least one modulated RF signal from the DSP array. The modulated RF signal has independent modulation from the other modulated RF signals for simultaneous transmission. A second RF harmonic filter bank is operatively connected to the RF-DAC for the suppression of sampling process artifacts, including signals harmonics. An RF pre-amp system is operatively connected to the second RF harmonic filter bank for the linear amplification of the RF signals to a working level for an RF power amplifier. At least one block translator system is operatively connected to the RF pre-amp system for providing a frequency translation of a pre-amplified frequency block to a final frequency band. An RF power amplifier linearly amplifies pre-amplified frequency blocks with transmit signal content from the pre-amp system, as well as translated frequency blocks with transmit signal content from the block translators.

Thus, a set of cognitive waveforms are generated within the DSP array for transmission from the antenna system and recovery processed within the DSP array for reception from the antenna system. Orthogonal frequency division multiplexed (OFDM) data packets are interleaved with short duration gaps, wherein the data packets are randomly distributed simultaneously over a subset of multiple unoccupied frequencies from an OFDM frequency set. The combination of the data packets in time and frequency provide a data message. The data packets are transmitted and the received channels signals activity is monitored during the short duration gaps between data packets so as to maintain rapid response to the changes in the spectral environment. The data packets further contain supervisory information and error correction coding, in both time and frequency, to allow for robust message data reception and recovery by users without prior time and frequency synchronization. The data packets are on subsets of the OFDM frequency set. The number of simultaneous packets can be increased to increase the overall message throughput and decreased to respond to currently reduced numbers of unoccupied frequencies.

In another broad aspect, the present invention is a full-duplex, software-defined and staring cognitive communications system, including a broadband antenna system with at least one broadband antenna. An antenna interface unit is operatively connected to the broadband antenna. The antenna interface unit includes an isolation element operatively connected between a transmitter system and a staring receiver system for partial suppression of transmit to receive signal leakage during simultaneous transmit and receive operations. A summing element is operatively connected between an output port of the isolation element, an output port of a low power radio frequency-digital-to-analog converter (RF-DAC) of the transmitter system, and an input port of a pre-select filter bank element for additional suppression of transmit to receive signal leakage during simultaneous transmit and receive operations. The signal leakage suppression results from a controlled combining of the low power DAC signal output with a receive signal output of the isolation element. The pre-select filter bank element is operatively connected between the isolation element's output port and an input port of the staring receiver, for receiving RF signals from the summing element and for separating and isolating frequency block sets for further signal pre-processing in the staring receiver system.

The staring receiver system is operatively connected to the broadband antenna system for viewing and pre-processing input RF signals present in a plurality of channels at the same time. The staring receiver system includes at least one staring receiver subsystem. The staring receiver subsystem includes at least one parallel channelization, automated gain control (AGC) and signal detection pre-processor system. Each AGC and signal detection pre-processor system includes a fan-out element for replicating the input RF signals into a plurality of pre-process channels along an RF spectral block. A plurality of pre-process channel miniature RF filters, aligned in parallel, for continuous frequency coverage along the RF spectral block, separate and isolate a set of comparatively narrow frequency channels on a substantially continuous basis. A plurality of gain control elements provide automatic channelized level control, under intelligent process control, of the isolated channels. A plurality of RF signal detectors receive the isolated channels for detecting the presence of signals content, for further determining relative levels, center frequencies, and bandwidths. A fan-in element combines the plurality of level controlled, isolated channels to a common RF spectrum, thus providing a pre-processed receive RF output. A set point summing amplifier combines the pre-processed receive RF outputs and provides a combined output. A radio frequency-analog-to-digital converter (RF-ADC) receives the combined output and converts it to a digital output. The parallel channelization, automated gain control (AGC) and signal detection pre-processor system is configured to allow viewing and conversion of the plurality of channels on a substantially continuous basis without overloading the RF-ADC.

A coordinated digital signal processing (DSP) array is operatively connected to the staring receiver system for providing digital signal processing of the receive and transmit signal sets, on a real-time basis, as well as management of the software defined and staring cognitive communications system from the digital domain. A transmitter system is operatively connected to the DSP array and to the broadband antenna system. The transmitter system includes at least one transmitter subsystem. The transmitter subsystem includes a radio frequency-power output-digital-to-analog converter (RF-Power-DAC) for receiving at least one modulated RF signal from the DSP array. The modulated RF signal has independent modulation from the other modulated RF signals for simultaneous transmission. The RF-Power-DAC has output analog filtering to adequately suppress sampling signal artifacts from above the first Nyquist band. A low power radio frequency-digital-to-analog converter (RF-DAC) receives at least one modulated RF signal from the DSP array. The modulated RF signal is negatively matched to the transmit leakage signal at the broadband antenna system's summing element, for the purpose of further suppressing the transmit leakage in the receiver system's RF signal input.

Thus, a set of cognitive waveforms are generated within the DSP array for transmission from the antenna system and recovery processed within the DSP array for reception from the antenna system. The orthogonal frequency division multiplexed (OFDM) data packets are interleaved with short duration gaps, wherein the data packets are randomly distributed simultaneously over a subset of multiple unoccupied frequencies from an OFDM frequency set, and whereas the combination of the data packets in time and frequency provide a data message. The data packets are transmitted and received channels signals activity is monitored simultaneously and continuously so as to maintain rapid response to the changes in the spectral environment. The data packets further contain supervisory information and error correction coding, in both time and frequency, to allow for robust message data reception and recovery by users without prior time and frequency synchronization. The data packets are on subsets of the OFDM frequency set wherein the number of simultaneous packets can be increased to increase the overall message throughput and decreased to respond to currently reduced numbers of unoccupied frequencies.

This integrated, multiple independent, simultaneous signal software defined radio system architecture is suitable for many new very-low latency, software defined radio applications, both cognitive and conventional, including: communications networks, electronic warfare, surveillance and radar. The system supports multiple operations, locally controlled or remotely controlled, with simultaneous signals prosecutions and anti-jam system-to-system networking. New cognitive waveforms are defined that simultaneously seek to maximize data throughput in arbitrary spectral environments, while normally avoiding interference with current and new arbitrary signal occurrences.

Conventional radios are generally set up for single frequency, tuned channel operation on frequency sets defined by prior allocation. Typically it requires 100s of microseconds to 10s of milliseconds to change and restabilize the channel frequency. This makes the time to scan large bandwidths for signal content and respond accordingly significantly larger than desired. This long delay precludes the reliable monitoring of the spectral content and the application of cognitive algorithms. Cognitive algorithms applied to conventional radios attempt to obtain timely information about the spectral environment and the nature of the signals present, such that operation is not limited to pre-allocated frequencies. If the system can reliably determine spectral signal activity on an ongoing, regional basis and effectively do so on a non-interfering basis with other signals, then the system can use these unallocated idle channel spaces between signals present to transmit new signals.

Clearly, conventional radios are not responsive enough to perform as effective cognitive radios. On the other hand, if the radio has the capability to continuously receive and process all the ongoing signals present in a wideband frequency block, including the recognition/characterization of all signals and the recovery of multiple desired signals, and then rapidly respond by transmitting as appropriate, multi-carrier, modulated signals, the system becomes an effective cognitive radio. The present inventive concepts use massively-parallel fixed tuned receive channelization, along with massively parallel digital signal processing and software generated, multi-modulated RF signals, to provide a system that is truly fast enough to cognitively manage the ongoing operation of multiple signals, multiple frequencies, and even multiple operations, all simultaneously. Changes in the received signals environment are typically detected, processed and responded to as much as 1,000 times faster than with conventional radios. In addition, the radio is also a true software defined digital radio, where arbitrary frequency channelization, bandwidth control and demodulation/modulation on multiple simultaneous signals are all performed in the digital (software) domain.

In other broad aspects of this invention either the half-duplex or the full-duplex, software-defined and staring cognitive communications system discussed above may not include OFDM cognitive waveforms. When these situations occur, virtual receive signal bandwidths are form within the DSP Array Processor, using software synthesized receive filters which have been formed to equalize the RF signals' band-pass amplitude and group delay responses, as well as selectively isolate the signals for recovery processing. In this way, the half-duplex and full-duplex radio system embodiments are truly software defined radios, requiring no tuned RF channelization hardware prior to the RF-ADC.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
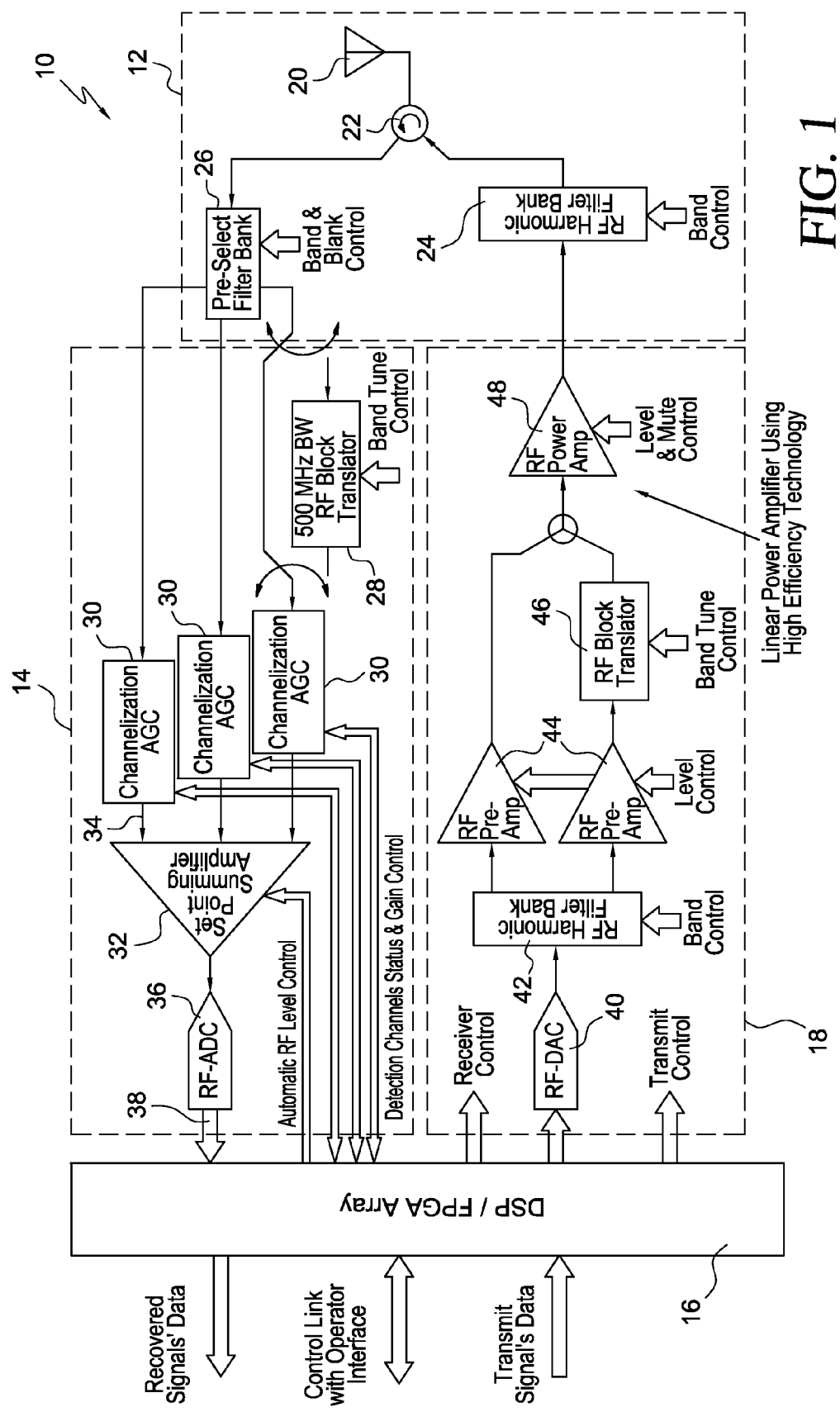
FIG. 1 is a schematic illustration of a half-duplex, software defined and staring cognitive communications system implementation of the present invention.

Referring now to the drawings and the characters of reference marked thereon, FIG. 1 illustrates a half-duplex, software defined and staring cognitive communications system implementation of the present invention, designated generally as 10. The system 10 includes a broadband antenna system 12, a staring receiver system 14, a coordinated digital signal processing (DSP) array 16, and a transmitter system 18.

The broadband antenna system 12 includes at least one broadband antenna 20. An antenna interface unit is operatively connected to the broadband antenna 20. The antenna interface unit includes a circulator 22 or fast T/R switch, functioning as an isolation element operatively connected between the transmitter system 18 and the staring receiver system 14 for supporting short switch times between transmit and receive operations. A first RF harmonic filter bank 24 is operatively connected to the isolation element (i.e. circulator 22) for providing suppression of transmit signal set harmonics in the RF power output. A pre-select filter bank 26 receives RF signals from the isolation element and separates and isolates frequency block sets for further signal pre-processing.

As used herein the term "short switch times" refers to minimally short switch times, where the duration does not adversely affect the transmit data throughput and the receive spectral aperture times. For example, if transmit dwells were 10 mS and receive look-through windows were 1 mS, then any T/R time greater than 0 mS can start to effect the transmit and receive times, e.g. a T/R time of 0.5 mS could reduce the transmit throughput by 5% or the receive look times by 50%.

The staring receiver system 14 is operatively connected to the broadband antenna system for viewing and pre-processing RF signals present in a plurality of channels at the same time. The staring receiver system has at least one staring receiver subsystem. FIG. 1 shows a single staring receiver subsystem 14. (As will be discussed below, with respect to FIG. 4 multiple staring receiver subsystems can be used.)

The staring receiver subsystem 14 includes at least one block translator 28 operatively switch connected to the pre-select filter bank 26 for providing a frequency translation (down conversion) of a pre-selected frequency block. Staring receiver subsystem 14 includes at least one parallel channelization, automated gain control (AGC) and signal detection pre-processor system 30. A set point summing amplifier 32 combines pre-processed receive RF outputs 34 from the pre-processor system 30 and provides a combined output. A radio frequency-analog-to-digital converter (RF-ADC) 36 receives the combined output and converts it to a digital output 38. The parallel channelization, automated gain control (AGC) and signal detection pre-processor system 30 will be discussed in detail below with respect to FIG. 3. It is configured to allow viewing and conversion of a plurality of channels on a continuous basis without overloading the RF-ADC 36.

The coordinated digital signal processing (DSP) array 16 is operatively connected to the staring receiver system 14 for providing digital signal processing of the receive and transmit signal sets, on a real-time basis, as well as management of the software defined and staring cognitive communications system 10 from the digital domain.

The transmitter system 18 is operatively connected to the DSP array 16 and to the broadband antenna system 12. The transmitter system 18 includes at least one transmitter subsystem 18. FIG. 1 shows a single transmitter subsystem 18. (As will be discussed below, with respect to FIG. 4 multiple transmitter subsystems can be used.)

The transmitter subsystem 18 includes a radio frequency-digital-to-analog converter (RF-DAC) 40 for receiving at least one modulated RF signal from the DSP array 16. The modulated RF signal has independent modulation from the other modulated RF signals for simultaneous transmission. A second RF harmonic filter bank 42 is operatively connected to the RF-DAC for the suppression of sampling process artifacts, including signals harmonics. An RF pre-amp system 44 is operatively connected to the second RF harmonic filter bank 42 for the linear amplification of the RF signals to a working level for an RF power amplifier. At least one block translator system 46 is operatively connected to the RF pre-amp system 44 for providing a frequency translation (up conversion) of a pre-amplified frequency block to a final frequency band. An RF power amplifier 48 linearly amplifies pre-amplified frequency blocks with transmit signal content from the pre-amp system 44, as well as translated frequency blocks with transmit signal content from the block translators 46.

Figure 2:
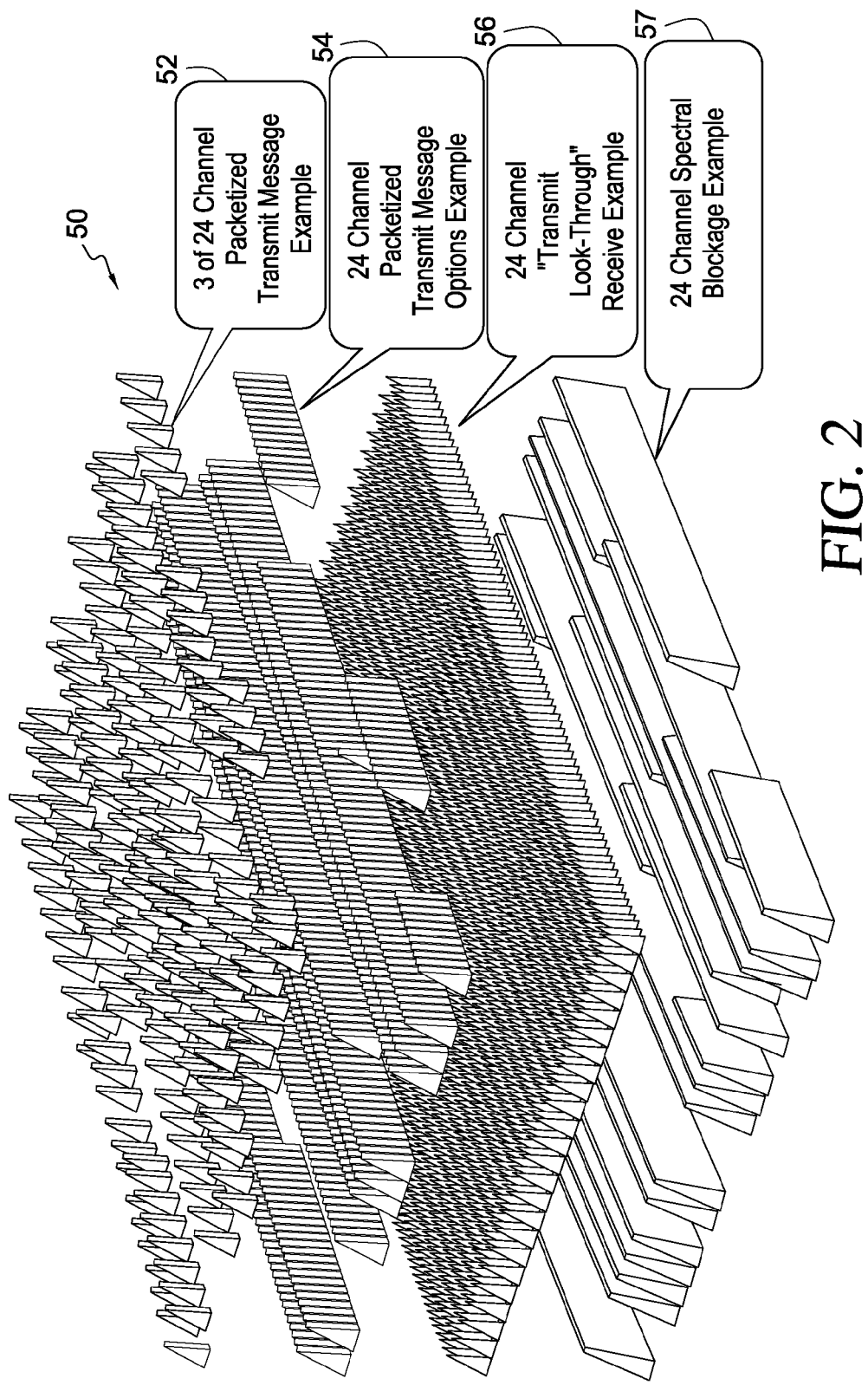
FIG. 2 is a schematic illustration of the cognitive waveform of the FIG. 1 embodiment.

Referring now also to FIG. 2, a cognitive waveform example 50 is generated within the DSP array 16 for transmission from the antenna system 12 and recovery processed within the DSP array 16 for reception from the antenna system 12. Orthogonal frequency division multiplexed (OFDM) data packets 52 are interleaved with short duration gaps. The short duration gaps are a compromise between minimum duration, which maximizes transmission message throughput, and maximum duration, which minimizes the time where the receive spectrum is not being monitored. When new signal receptions occur during transmit and the receive and transmit signals overlap, then interference can occur until the transmission signal packet ends and the new signal reception can be recognized.

The data packets 52 are randomly distributed simultaneously over a subset of multiple unoccupied frequencies from currently unoccupied OFDM frequencies 54. The combination of the error correction coded data packets in time and frequency provide a robust data message transmission. Each data packet includes synchronization and supervisory data sufficient to demodulate, decode and reassemble the message data. This invention provides "look-around-transmit", using different frequency blocks for simultaneous receive and transmit, and "look-through-transmit" receiver monitor on all channels in the same spectral block 56. Receiver monitor on all channels is continuous in the non-transmit mode. It maintains a "regionalized" spectral content table with continuous updates, based on local and remote channels activity status. The spectral block's channels activity status is part of the transmit data packet's supervisory data, along with the transmitted power level, and is used to regionalize the local spectral content table. It uses programmed channel "lock-outs" to prohibit transmit use (busy or not-busy). Using the regionalized spectral content table, the optimal use of spectral channels for transmit is dynamically determined. Currently, RF communications and radar are restricted to allocated channels and bands. The invention provides robust, non-interfering, viable cognitive communications, with ad hoc networks, without being restricted by fixed spectral allocations.

Regarding the available channelization for transmission of data packets: the spectral block 57 is unavailable for transmit on any single channel, however, the spectral block is available for packetized transmission on several channels using dynamic channelization and limited duration data packets (estimated 10-100 ms). Data packet headers are utilized containing all required information to process and reconstruct message data. Dynamic transmit power control is utilized based on receive power levels. This restricts excessive transmit power. It reduces unavoidable interference.

This example shows a random packet channelized OFDM waveform with three of 24 channelized dwells. It involves pseudo-random data packet frequency channel placement that minimizes conflicts with and interference from new arrival signals. Successive common channel data packet dwells are normally never allowed. This three of 24 channel example is a scaled version of a preferred 256 channel system, 32 channel mode. Of course a 256 channel system can have other channel modes, such as 128, 64, or 16 of 256 for example.

Figure 3:
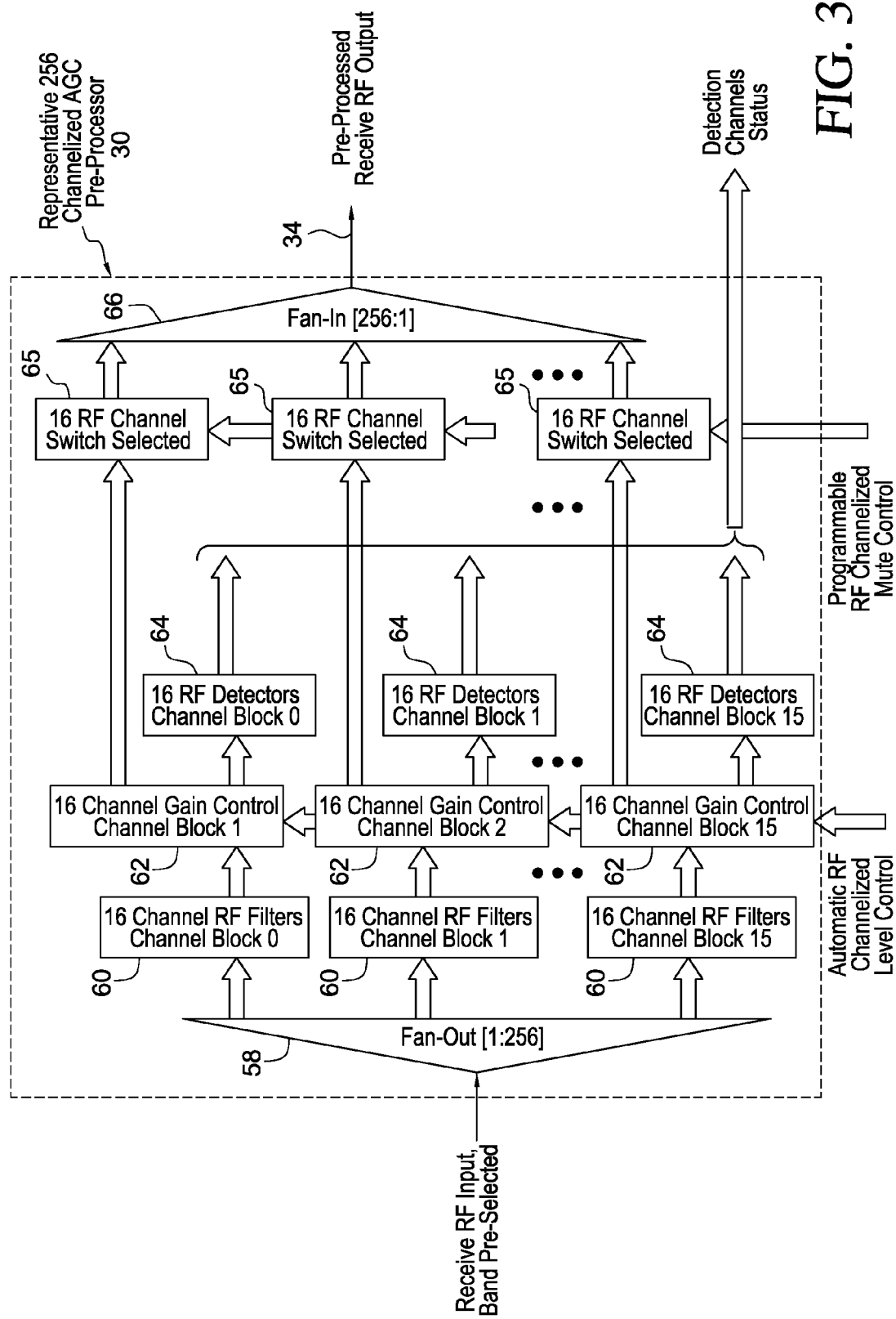
FIG. 3 shows the parallel channelization, automated gain control (AGC) and signal detection pre-processor system of the FIG. 1 embodiment.

Referring now to FIG. 3, a channelization, automated gain control (AGC) and signal detection pre-processor system 30 is illustrated. System 30 includes a fan-out element 58 for replicating the pre-selected RF signals from the pre-select filter bank 26 into a plurality of pre-process channels along an RF spectral block. A plurality of pre-process channel miniature RF filters 60, aligned in parallel, for continuous frequency coverage along the RF spectral block, are used to separate and isolate a set of comparatively narrow frequency channels on a continuous basis. A plurality of gain control elements 62 provide automatic channelized level control, under intelligent process control, of the isolated channels. Intelligent process control indicates that the automatic channelized level control is going to be determined by relative signal levels in all of the adjacent filters, to maintain the ensemble output within the circuits and the ADC's dynamic range, as well as the recognition that signal contents in subset filter groups may contain parts of the same signal, e.g. the low, medium and high frequency part of a signal in three adjacent filters, which should have the same level adjustment. A plurality of RF signal detectors 64 receive the isolated channels for detecting the presence of signals content, for further determining relative levels, center frequencies, and bandwidths. A plurality of program selected RF channel switches 65 receive the isolated channels for selectively muting signals content that is of no current interest. A fan-in element 66 combines the plurality of passed and level controlled, isolated channels to a common RF spectrum, thus providing the pre-processed receive RF output 34.

The present architecture can be realized by use of three dimensional silicone layered wafer-scale stacking technology. This technology is disclosed in, for example, U.S. Pat. No. 7,385,334, entitled "Contour Mode Resonators With Acoustic Reflectors," issued to R. H. Olsson et al; and, U.S. Pat. No. 7,616,077, entitled "Microelectromechanical Resonator and Method For Fabrication", issued to J. W. Wittwer et al. U.S. Pat. Nos. 7,385,334 and 7,616,077 are hereby incorporated by reference in their entireties.

Referring again to FIG. 1, there are further areas of technical specialization, albeit within the capabilities of current technology to implement and future technology to improve system performance. For example, current antenna technology would require a multiple radiating element architecture in sub-bands with automatic parallel combining to span the wide system operating frequency range, 30 MHz to 6 GHz in the figure's system example. Current RF-ADC and RF-DAC technology, using a 2 GHz sample clock rate, has limited wide band spurious and distortion free dynamic ranges, 50 to 70 dB for the RF-ADC and 60 to 70 dB for the RF-DAC. Future data converters will extend the performance range by another 20 to 40 dB, or more, thereby improving the dynamic range handling of large numbers of simultaneous signals. For example, U.S. Pat. No. 6,373,418, entitled "Nyquist Response Restoring Delta-Sigma Modulator Based Analog-To-Digital And Digital-To-Analog Conversion," issued to D. L. Abbey, describes technology to improve the dynamic ranges of RF data converters, and is hereby incorporated by reference in its entirety. An example of current digital signal processing array technology is represented by the cascadable "hx3100 DSP Array" from Coherent Logic, Inc. The integrated circuit incorporates 100 processing elements, each with memory and arrayed interface support. The 500 MHz clock rate supports up to 50 billion instructions per second, including multiply-accumulate. A DSP Array is needed to support the high volume of continuous real time signals' processing and system control required by the system.

FIGS. 1 and 3 combined further provides an example of the invention, configured to support 30 MHz to 750 MHz of direct sampled coverage and 750 MHz to 6 GHz of block translated coverage in 500 MHz overlapping blocks. Three channelized automated gain control (AGC) and signal detection pre-processor receive blocks are used to span 30 MHz to 750 MHz in 256 channels each. The low frequency block covers 30 MHz to 100 MHz, the middle frequency block covers 100 MHz to 250 MHz, and the high frequency block covers 250 MHz to 750 MHz. If the RF-ADC and RF-DAC sample clock rate and dynamic range performance is increased, the number of direct sampled 500 MHz coverage blocks can be increased, along with possible increases in the number of RF block translators, allowing for a wider continuous spectral coverage bandwidth. In addition, channelized automated gain control (AGC) and signal detection pre-processor receive blocks can span more than 500 MHz at higher frequencies to reduce the total number of blocks required. Also the number of channels per block can be more or less, based on what is determined to be optimum for the overall system and signal waveforms implementations.

Figure 4:
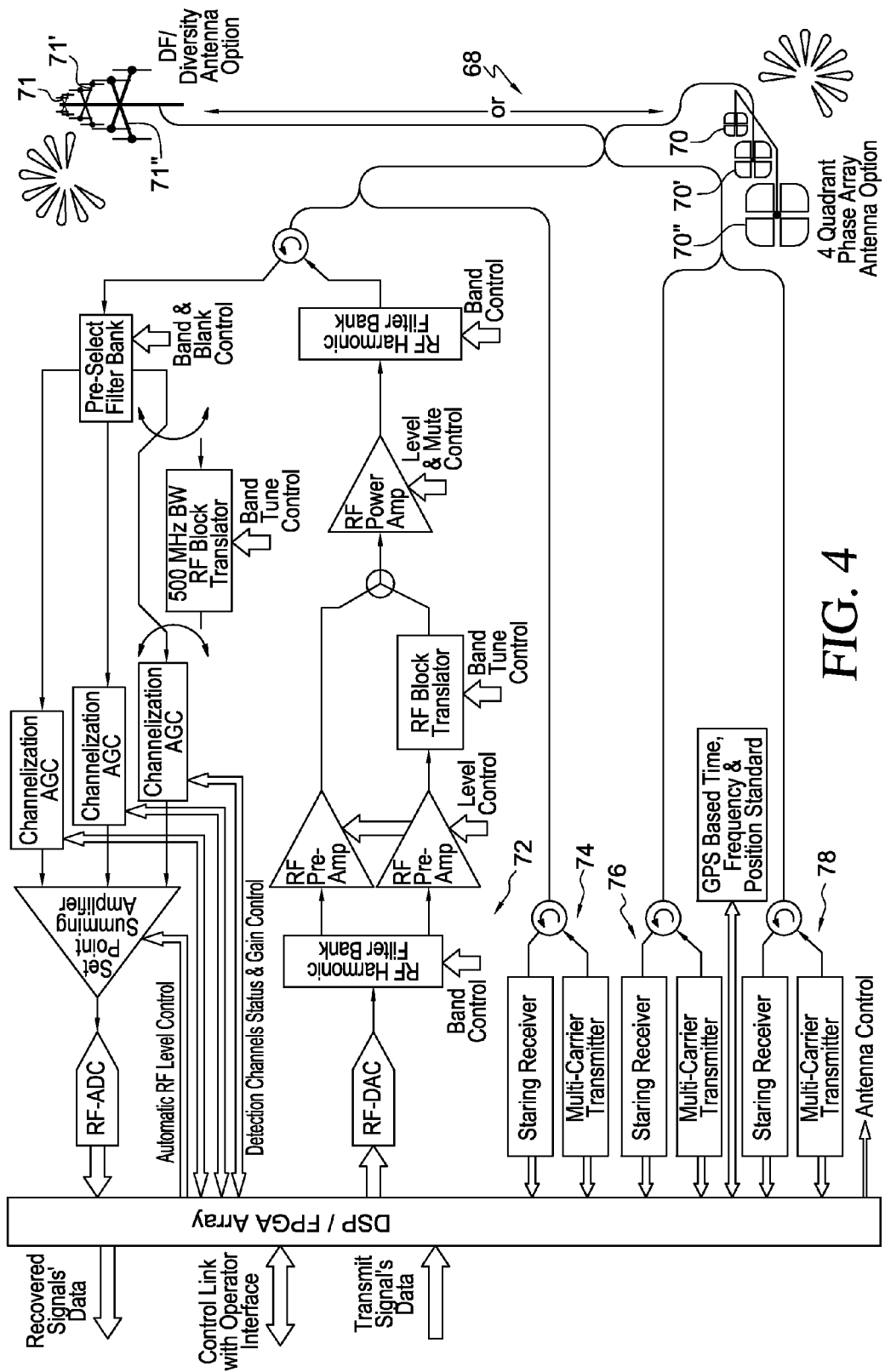
FIG. 4 is a schematic illustration of the half-duplex, software defined and staring cognitive communications system implemented as a 4-quadrant, antenna beam forming radio.

Referring now to FIG. 4, a 4 quadrant, multiple directional beam forming antenna embodiment is illustrated, designated generally as 68. This embodiment uses a set of 3-sub-banded 4 quadrant antennas shown as direction finding DF/Diversity option 71, 71', 71" and Phased Array option 70, 70', 70". Each of the 4 quadrant antennas in a set signifies a different frequency coverage band (low, medium, and high), since 30 MHz to 6 GHz of coverage represents a long span for a single radiating element to handle efficiently. The use of 4 quadrant, multiple directional beam forming antennas is preferred because that is a typical balance between performance and complexity. The number of elements can be more or less than four, but that means that the number of receiver and transmitters would be more or less as well. However, more antenna elements generally equates to better control on beam width and directionality.

As shown in FIG. 4, the receiver and transmitter embodiment of FIG. 1 is replicated four times, each receiver and transmitter being associated with the common digital signal processing array and one of the four antenna quadrants. Each receiver and transmitter pair 72, 74, 76, & 78 can function independently, but normally functions as a directional beam forming group.

With directional beam formation, in transmit, the same modulated RF signals are each pre-processed in the DSP before being sent to each of the respective transmitters and antennas. This pre-processing consists of delaying and weighting (phase and amplitude) each of the modulated component signals such that when they are combined in the antenna radiation pattern, a directional radiation beam is formed in a specific direction. Basically the weightings are to compensate for differences in the transmit paths and the delays are to time shift the radiated signals and force the directional beam forming. These delay and weight values can be maintained in a lookup table corresponding to azimuth and elevation angles. When multiple signals, on different frequencies, are to be transmitted on independent directional beams, they are weighted and delayed independently and can exist simultaneously on separate directional beams.

In Receive, the process is somewhat reversed. Each antenna reception can be weighted and delayed in the DSP to form effective directional beams. These values can be determined in different ways. For example, there are signals separation algorithms that algorithmically vary the values so as to maximize the signal-to-noise ratio performance on each signal. However a more directed way would be to determine the signal's angles-of-arrival, using interferometer techniques (i.e. phase shifts between received signals). Once the direction of the signals is determined, a lookup table method can be used to determine the weights and delays to put a receive directional beam in the desired directions.

The directional beam forming system embodiments provides multiple beams on multiple signals on multiple frequencies, all simultaneously for receive or transmit. This capability is currently only available when using active electronically scanned array (AESA) antenna technology, where each antenna element has an independent radio receiver and transmitter and signal processing. The system embodiment, with centralized receivers, transmitters, and digital signal processing, can perform much more efficiently and cost effectively than the AESA based systems. In addition, the operational flexibility and frequency range of the system embodiment is far greater than with AESA based systems.

Figure 5:
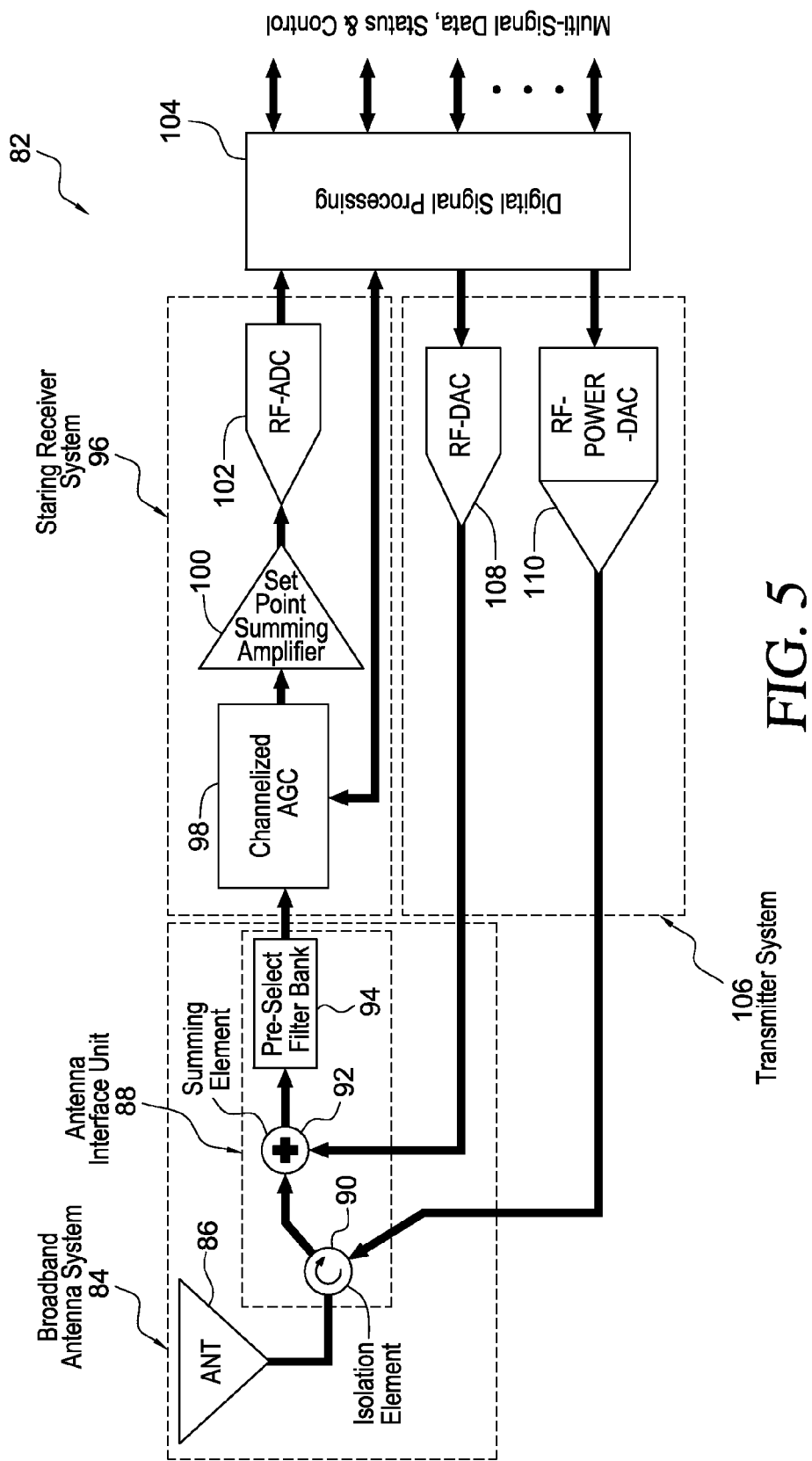
FIG. 5 is a schematic illustration of a full duplex, software defined and staring cognitive communications system implementation of the present invention.

Referring now to FIG. 5, utilization of the principles of this invention a full-duplex, software defined and staring cognitive communications system implementation of the present invention for a direct sampled RF, digital full duplex radio is illustrated, designated generally as 82. System 82 includes a broadband antenna system that includes at least one broadband antenna 86 and an antenna interface unit 88 operatively connected to the broadband antenna 86. The antenna interface unit 88 includes an isolation element 90, a summing element 92, and a pre-select filter bank element 94. The pre-select filter bank element 94 is operatively connected between the summing element's output port and an input port of a staring receiver system, for receiving RF signals from the summing element 92 and for separating and isolating frequency block sets for further signal pre-processing in the staring receiver system. The staring receiver system, designated generally as 96, includes at least one parallel channelization, automated gain control (AGC) and signal detection pre-processor system 98, a set point summing amplifier 100, and a radio frequency-analog-to-digital converter (RF-ADC) 102. A coordinated digital signal processing (DSP) array 104 is operatively connected to the staring receiver system 96. A transmitter system 106 is operatively connected to the DSP array 104 and to the antenna interface unit 88. The transmitter system 106 includes at least one transmitter subsystem having a radio frequency-power output-digital-to-analog converter (RF-Power-DAC) 108 and a low power radio frequency-digital-to-analog converter (RF-DAC) 110. The RF-Power-DAC 108 has output analog filtering to adequately suppress sampling signal artifacts from above the first Nyquist band. The data packets are transmitted and received channels signals activity is monitored simultaneously and continuously so as to maintain rapid response to the changes in the spectral environment.

Figure 6:
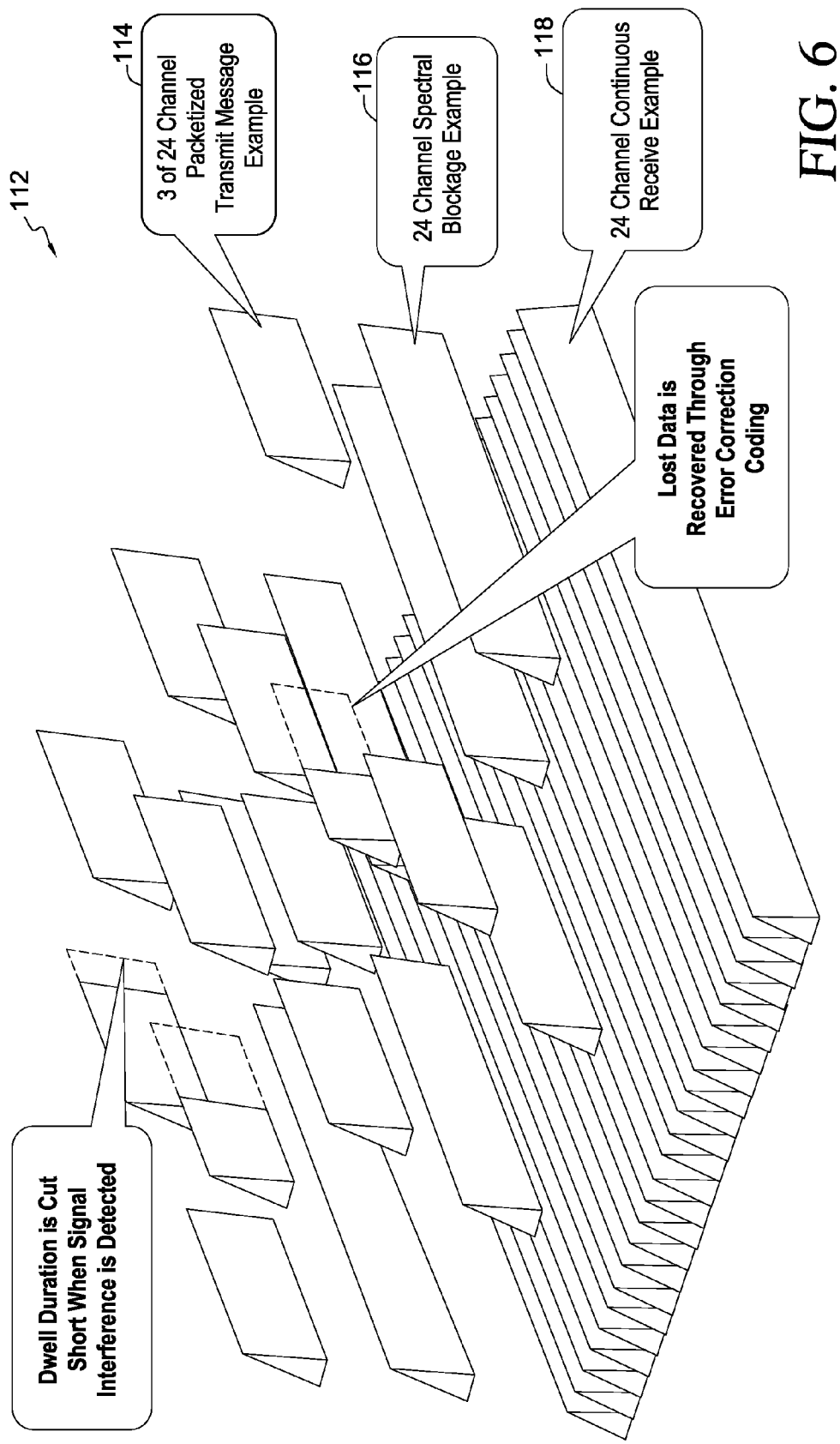
FIG. 6 is a schematic illustration of the cognitive waveform of the FIG. 5 embodiment.

Referring now to FIG. 6, for this full-duplex case, an example cognitive waveform is illustrated, designated generally as 112. Orthogonal frequency division multiplexed (OFDM) data packets 114 are interleaved with short duration gaps. The data packets are randomly distributed simultaneously over a subset of multiple unoccupied frequencies from currently unoccupied OFDM frequencies. The ongoing spectral activity block 116 shows that transmitting on any single channel is not possible, however, the spectral block is available for packetized transmission on several channels using dynamic channelization and limited duration data packets. Instead of packetized receive windows there is continuous "receive-during-transmit", as indicated by numeral designation 118. This allows full monitor capability without regard to transmit. As soon as an interfering signal is detected on a currently transmitting channel, transmission is stopped and muted for a particular dwell, in reaction to the interfering signals. There is no waiting until transmit dwell ends to detect interfering signals and avoid further interference. This fast response to multiple spectral signal content changes and corresponding changes in multiple signals transmission can be carried into other waveforms and operational modes, such as legacy communications, anti-jam communications signals recognition and jamming, signals surveillance and recovery, and non-interfering radar.

This continuous staring spectral content monitor supports all aperture waveforms, including OFDM cognitive waveforms. It maintains continuous spectral content table updates. In this three of 24 channelized dwells example, pseudo-random data packet frequency channel placement minimizes conflicts and interference with new arrivals signals. Successive common channel dwells are normally never allowed. When there are conflicting detected signal arrivals during transmit, the interfering transmit dwell is cut short to preclude further interference. Error correction coding can then recover lost information at the receivers.

Figure 7:
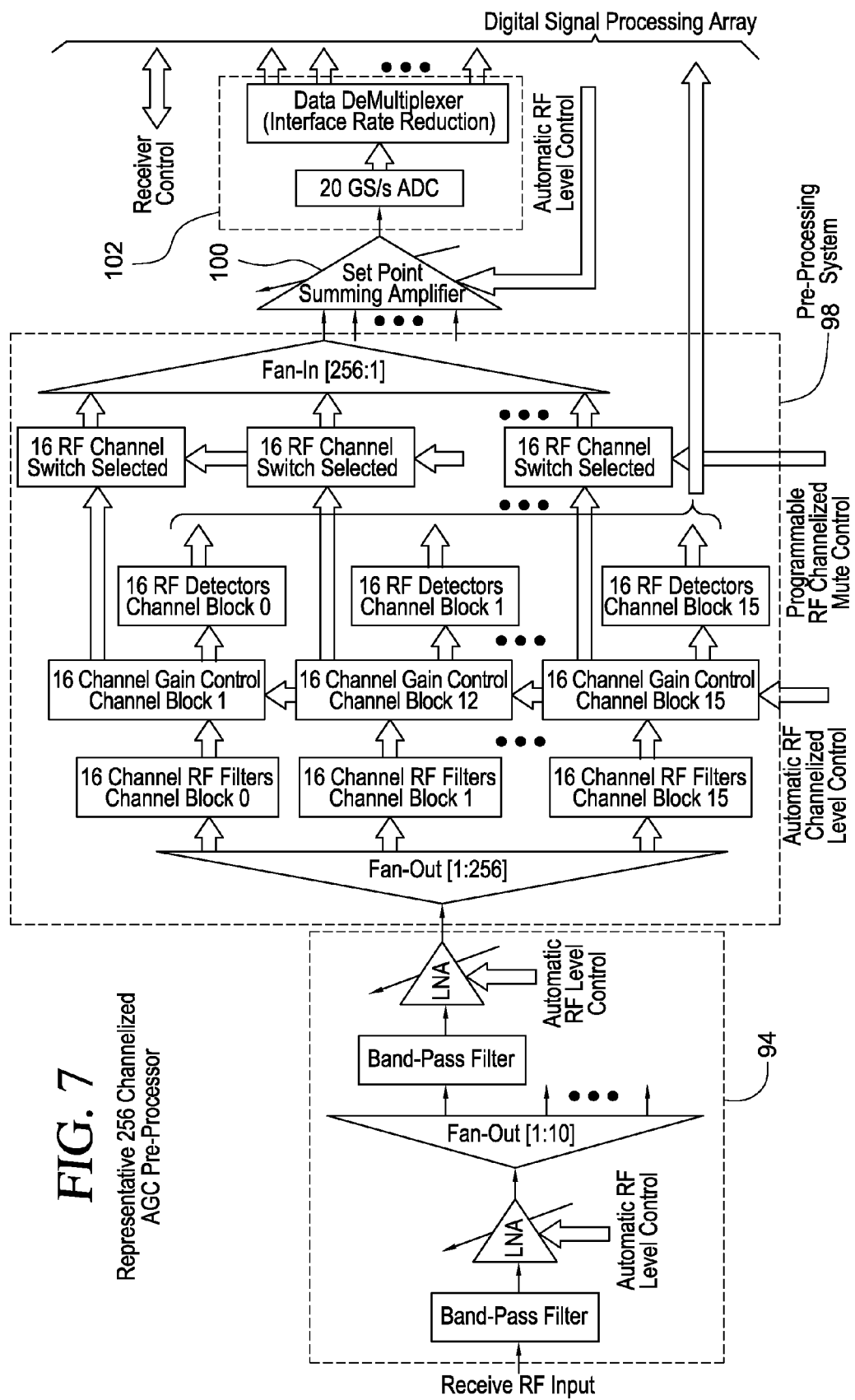
FIG. 7 shows the parallel channelization, automated gain control (AGC) and signal detection pre-processor system of the FIG. 5 embodiment.

Referring now to FIG. 7, the parallel channelization, automated gain control (AGC) and signal detection pre-processor system 98 of the FIG. 5 embodiment is illustrated. The figure shows how the channelized pre-processor system block, 256 channels in this example, configured the same as the pre-processor system block example of FIG. 3, is replicated 10 times in this example to span the 30 MHz to 6000 MHz direct sampled Received RF frequency span. In this example the block bandwidths are, low frequency to high frequency, 1 at 70 MHz, 1 at 150 MHz, 4 at 500 MHz and 4 at 1000 MHz. The system blocks between the Receiver RF Input and the pre-processor block inputs, collectively item 94, provide the ten way fanout and preselection signal conditioning and sub-band separations required for the pre-processor blocks. The system blocks between the pre-processor block output and the DSP Array Input reform the pre-processed RF spectrum, 30 MHz to 6000 MHz in this example, using the 10 input level adjusting summing amplifier, and converts the spectrum to the digital domain using the 20 GS/s RF-ADC. Collectively the ADC and the output data demultiplexer form the RF-ADC, shown as item 102. The data demultiplexer performs a serial-to-parallel operation on the ADC output data to reduce the 20 GS/s data rate to a lower interface rate with the DSP array, which currently do not extend to 20 GS/s.

Figure 8:
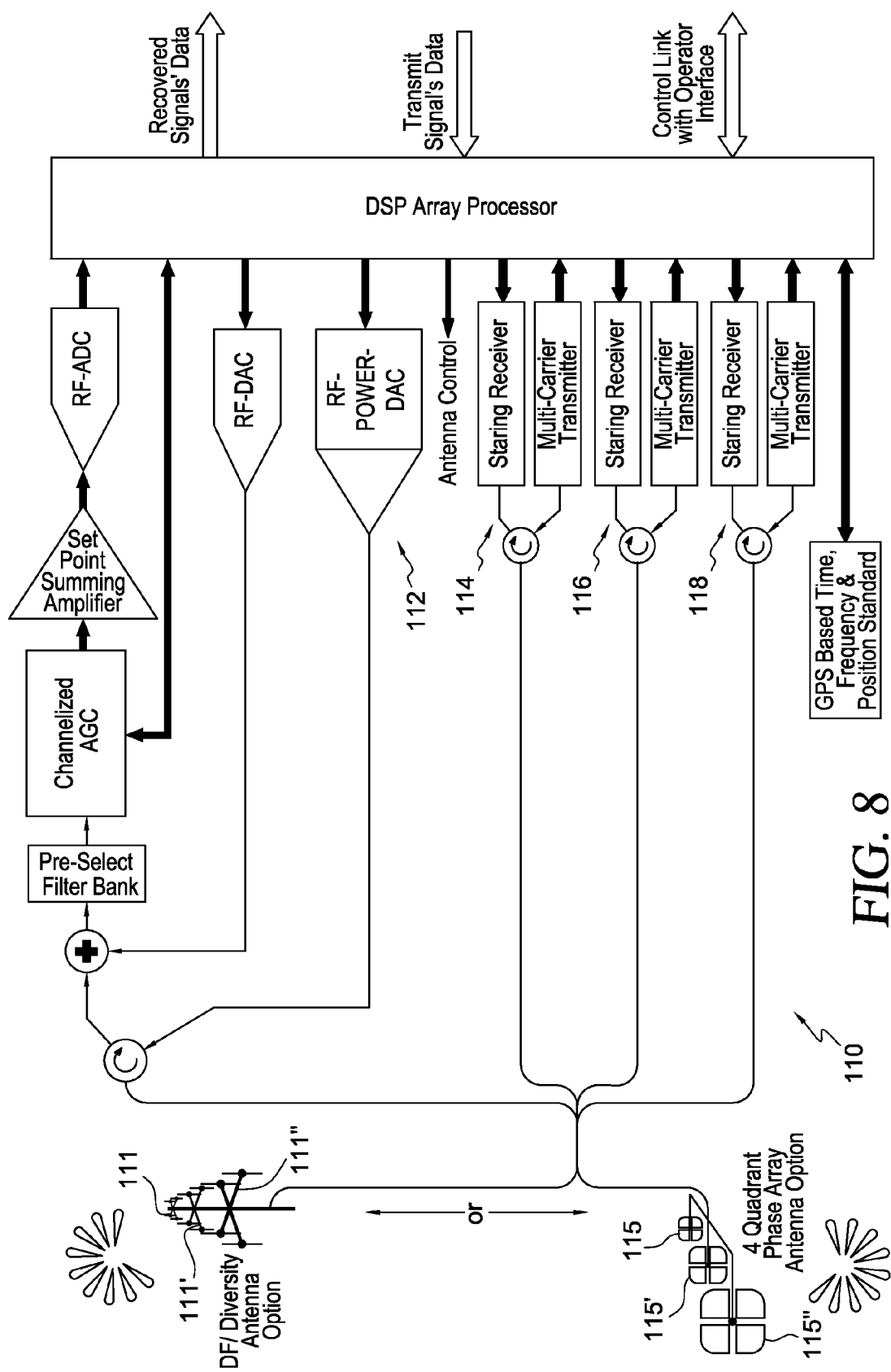
FIG. 8 is a schematic illustration of the full-duplex, software defined and staring cognitive communications system implemented as a 4-quadrant, antenna beam forming radio.

Referring now to FIG. 8 a schematic illustration of the full-duplex, software defined and staring cognitive communications system implemented as a 4-quadrant, antenna beam forming radio is illustrated, designated generally as 110. This embodiment is similar to the half-duplex embodiment of FIG. 4 and uses a set of 3-sub-banded 4 quadrant antennas shown as direction finding DF/Diversity option 111, 111', 111" and Phased Array option 115, 115', 115". Each of the 4 quadrant antennas in a set signifies a different frequency coverage band (low, medium, and high), since 30 MHz to 6 GHz of coverage represents a long span for a single radiating element to handle efficiently. The use of 4 quadrant, multiple directional beam forming antennas is preferred because that is a typical balance between performance and complexity. The number of elements can be more or less than four, but that means that the number of receiver and transmitters would be more or less as well. However, more antenna elements generally equates to better control on beam width and directionality. As shown in FIG. 8, the receiver and transmitter embodiment of FIG. 5 is replicated four times, each receiver and transmitter being associated with the common digital signal processing array and one of the four antenna quadrants. Each receiver and transmitter pair 112, 114, 116, & 118 can function independently, but normally functions as a directional beam forming group.

The full-duplex multiple directional beam forming capabilities of the full-duplex embodiment are the same as those of the half-duplex embodiment and more. The full-duplex system supports simultaneous multiple directional antenna beams in receive and transmit concurrently. The transmit to receiver signal leakage is manifest as a composite of all the transmitted signals, not just the transmitted RF-Power-DAC output from the transmitter and receiver pair. Therefore using the highly matched transfer characteristics of the RF-DACs and RF-Power-DACs, a transmit leakage composit signal for each RF-DAC can be formed in the DSP Array Processor and used to suppress the respective leakage for each receiver's pre-processor RF input.

Other embodiments and configurations may be devised without departing from the spirit of the invention and the scope of the appended claims. For example, relative to both the half-duplex and the full-duplex embodiments, the software-defined and staring cognitive communications system may be implemented without OFDM cognitive waveforms. The OFDM cognitive waveforms are configured to channelize according to the center frequency responses of the channelized automated gain control (AGC) and signal detection pre-processor system, i.e. 256 channels, supporting up to 256 signal carriers, in the examples of FIGS. 3 and 7. When the system receives signals, other than the OFDM cognitive waveforms, the signals are likely to exist anywhere within the fixed channel filter set. This could include cases where the signals are confined to one filter bandwidth, but not centered, and cases where the signals span more than one filter bandwidth. When these situations occur, virtual receive signal bandwidths are form within the DSP Array Processor, using software synthesized receive filters which have been formed to equalize the RF signals' band-pass amplitude and group delay responses, as well as selectively isolate the signals for recovery processing. In this way, the half-duplex and full-duplex radio system embodiments are truly software defined radios, requiring no tuned RF channelization hardware prior to the RF-ADC.

The invention claimed is:

1. A half-duplex, staring cognitive communications system, comprising:
 a) a broadband antenna system, comprising:
  i. at least one broadband antenna;
  ii. an antenna interface unit operatively connected to said at least one broadband antenna, said antenna interface unit comprising:
   1. an isolation element operatively connected between a transmitter system and a staring receiver system for supporting short switch times between transmit and receive operations;
   2. a first RF harmonic filter bank operatively connected to said isolation element for providing suppression of transmit signal set harmonics in the RF power output; and,
   3. a pre-select filter bank for receiving RF signals from said isolation element and for separating and isolating frequency block sets for further signal pre-processing;
 b) a staring receiver system operatively connected to said broadband antenna system for viewing and pre-processing input RF signals present in a plurality of channels at the same time, said staring receiver system comprising at least one staring receiver subsystem, said at least one staring receiver subsystem comprising:
  i. at least one block translator operatively switch connected to said pre-select filter bank for providing a frequency translation (down conversion) of a pre-selected frequency block;
  ii. at least one parallel channelization, automated gain control (AGC) and signal detection pre-processor system, each AGC and signal detection pre-processor system comprising:

1. a fan-out element for replicating said input RF signals into a plurality of pre-process channels along an RF spectral block;
2. a plurality of pre-process channel miniature RF filters, aligned in parallel, for continuous frequency coverage along said RF spectral block, for separating and isolating a set of comparatively narrow frequency channels on a substantially continuous basis;
3. a plurality of gain control elements for providing automatic channelized level control, under intelligent process control, of said isolated channels;
4. a plurality of RF signal detectors for receiving said isolated channels for detecting the presence of signals content, for further determining relative levels, center frequencies, and bandwidths; and,
5. a fan-in element for combining said plurality of level controlled, isolated channels to a common RF spectrum, thus providing a pre-processed receive RF output;
iii. a set point summing amplifier for combining said pre-processed receive RF outputs and providing a combined output; and,
iv. a radio frequency-analog-to-digital converter (RF-ADC) for receiving said combined output and converting it to a digital output,
wherein said at least one parallel channelization, automated gain control (AGC) and signal detection pre-processor system is configured to allow viewing and conversion of said plurality of channels on a substantially continuous basis without overloading said RF-ADC;
c) a coordinated digital signal processing (DSP) array operatively connected to said staring receiver system for providing digital signal processing of the receive and transmit signal sets, on a real-time basis, as well as management of the software defined and staring cognitive communications system from the digital domain; and,
d) a transmitter system operatively connected to said DSP array and to said broadband antenna system, said transmitter system comprising at least one transmitter subsystem, said at least one transmitter subsystem comprising:
i. a radio frequency-digital-to-analog converter (RF-DAC) for receiving at least one modulated RF signal from said DSP array, said at least one modulated RF signal having independent modulation from the other modulated RF signals for simultaneous transmission;
ii. a second RF harmonic filter bank operatively connected to said RF-DAC for the suppression of sampling process artifacts, including signals harmonics;
iii. an RF pre-amp system operatively connected to said second RF harmonic filter bank for the linear amplification of the RF signals to a working level for an RF power amplifier;
iv. at least one block translator system operatively connected to said RF pre-amp system for providing a frequency translation of a pre-amplified frequency block to a final frequency band; and,
v. an RF power amplifier for linearly amplifying pre-amplified frequency blocks with transmit signal content from the pre-amp system, as well as translated frequency blocks with transmit signal content from said block translators;
wherein a set of cognitive waveforms are generated within said DSP array for transmission from said antenna system and recovery processed within said DSP array for reception from the antenna system, and whereas orthogonal frequency division multiplexed (OFDM) data packets are interleaved with short duration gaps, wherein said data packets are randomly distributed simultaneously over a subset of multiple unoccupied frequencies from an OFDM frequency set, and whereas the combination of the data packets in time and frequency provide a data message,
 i. said data packets being transmitted and received channels signals activity being monitored during the short duration gaps between data packets so as to maintain rapid response to the changes in the spectral environment;
 ii. said data packets further containing supervisory information and error correction coding, in both time and frequency, to allow for robust message data reception and recovery by users without prior time and frequency synchronization; and,
 iii. said data packets being on subsets of the OFDM frequency set wherein the number of simultaneous packets can be increased to increase the overall message throughput and decreased to respond to currently reduced numbers of unoccupied frequencies.

2. The half-duplex, staring cognitive communications system of claim 1, wherein:
 a) said digital signal processing (DSP) array, comprises a single DSP array subsystem;
 b) said staring receiver system comprises at least two of said staring receiver subsystems;
 c) said transmitter system comprises at least two of said transmitter subsystems; and,
 d) said broadband antenna system comprises at least one of said broadband antennas, said at least one of said broadband antennas being an antenna subsystem with at least two radiation elements for simultaneous emission or reception,
 said software-defined and staring cognitive communications system having multiple, simultaneous directional emission or reception beams capability.

3. The half-duplex, staring cognitive communications system of claim 1, including a digital signal processing, a transmit and a receive capability for multiple simultaneous, arbitrary and software defined signal waveforms, where in said digital signal processing provides virtual channelization for said arbitrary signals.

4. The half-duplex, staring cognitive communications system of claim 1, wherein:
 a) said digital signal processing (DSP) array, comprises a single DSP array subsystem;
 b) said staring receiver system comprises at least two of said staring receiver subsystems;
 c) said transmitter system comprises at least two of said transmitter subsystems; and,
 d) said broadband antenna system comprises at least one of said broadband antennas, said at least one of said broadband antennas being an antenna subsystem with at least two radiation elements for simultaneous emission or reception,
 said software-defined and staring cognitive communications system having multiple, simultaneous directional emission or reception beams capability; and,
 said software-defined and staring cognitive communications system having capability for multiple simultaneous, arbitrary and software defined signal waveforms, wherein said digital signal processing array provides virtual channelization for said arbitrary signals.

5. The half-duplex, staring cognitive communications system of claim 1, wherein said broadband antenna system comprises a single radiating element antenna, said staring receiver system comprises one staring receiver subsystem, and said transmitter system comprises one transmitter subsystem.

6. The half-duplex, staring cognitive communications system of claim 1, wherein said broadband antenna system comprises a four radiating element antenna, said staring receiver system comprises four staring receiver subsystems, and said transmitter system comprises four transmitter subsystems.

7. The half-duplex, staring cognitive communications system of claim 1, wherein said isolation element comprises a circulator or fast T/R switch.

8. The half-duplex, staring cognitive communications system of claim 1, wherein said broadband antenna system comprises a single radiating element antenna, said staring receiver system comprises more than one staring receiver subsystems, and said transmitter system comprises more than one transmitter subsystems, said multiple receiver and transmitter subsystems simultaneously providing multiple frequency block translations and/or subdivision of the required RF frequency coverage.

9. The half-duplex, staring cognitive communications system of claim 1, wherein said broadband antenna system comprises a four radiating element antenna, said staring receiver system comprises four sets of more than one staring receiver subsystems, each set associated respectively with each of the four antenna radiating elements, and said transmitter system comprises four sets of more than one transmitter subsystems, each set associated respectively with each of the four antenna radiating elements, said multiple receiver and transmitter subsystems simultaneously providing multiple frequency block translations and/or subdivision of the required RF frequency coverage, and said four receiver and transmitter subsystem sets having multiple, simultaneous directional emission or reception beams capability.

10. A full-duplex, staring cognitive communications system, comprising:
   a) a broadband antenna system, comprising:
      i. at least one broadband antenna;
      ii. an antenna interface unit operatively connected to said at least one broadband antenna, said antenna interface unit comprising:
         1. an isolation element operatively connected between a transmitter system and a staring receiver system for partial suppression of transmit to receive signal leakage during simultaneous transmit and receive operations;
         2. a summing element operatively connected between an output port of said isolation element, an output port of a low power radio frequency-digital-to-analog converter (RF-DAC) of the transmitter system, and an input port of a pre-select filter bank element for additional suppression of transmit to receive signal leakage during simultaneous transmit and receive operations, the signal leakage suppression resulting from a controlled combining of the low power DAC signal output with a receive signal output of said isolation element;
         3. said pre-select filter bank element being operatively connected between the isolation element's output port and an input port of the staring receiver, for receiving RF signals from said summing element and for separating and isolating frequency block sets for further signal pre-processing in the staring receiver system;
   b) a staring receiver system operatively connected to said broadband antenna system for viewing and pre-processing input RF signals present in a plurality of channels at the same time, said staring receiver system comprising at least one staring receiver subsystem, said at least one staring receiver subsystem comprising:
      i. at least one parallel channelization, automated gain control (AGC) and signal detection pre-processor system, each AGC and signal detection pre-processor system comprising:
         1. a fan-out element for replicating said input RF signals into a plurality of pre-process channels along an RF spectral block;
         2. a plurality of pre-process channel miniature RF filters, aligned in parallel, for continuous frequency coverage along said RF spectral block, for separating and isolating a set of comparatively narrow frequency channels on a substantially continuous basis;
         3. a plurality of gain control elements for providing automatic channelized level control, under intelligent process control, of said isolated channels;
         4. a plurality of RF signal detectors for receiving said isolated channels for detecting the presence of signals content, for further determining relative levels, center frequencies, and bandwidths; and,
         5. a fan-in element for combining said plurality of level controlled, isolated channels to a common RF spectrum, thus providing a pre-processed receive RF output;
      ii. a set point summing amplifier for combining said pre-processed receive RF outputs and providing a combined output; and,
      iii. a radio frequency-analog-to-digital converter (RF-ADC) for receiving said combined output and converting it to a digital output,
      wherein said at least one parallel channelization, automated gain control (AGC) and signal detection pre-processor system is configured to allow viewing and conversion of said plurality of channels on a substantially continuous basis without overloading said RF-ADC;
   c) a coordinated digital signal processing (DSP) array operatively connected to said staring receiver system for providing digital signal processing of the receive and transmit signal sets, on a real-time basis, as well as management of the software defined and staring cognitive communications system from the digital domain; and,
   d) a transmitter system operatively connected to said DSP array and to said broadband antenna system, said transmitter system comprising at least one transmitter subsystem, said at least one transmitter subsystem comprising:
      i. a radio frequency-power output-digital-to-analog converter (RF-Power-DAC) for receiving at least one modulated RF signal from said DSP array, said at least one modulated RF signal having independent modulation from the other modulated RF signals for simultaneous transmission, said RF-Power-DAC having output analog filtering to adequately suppress sampling signal artifacts from above the first Nyquist band; and,
      ii. a low power radio frequency-digital-to-analog converter (RF-DAC) for receiving at least one modulated RF signal from said DSP array, said at least one modulated RF signal being negatively matched to the transmit leakage signal at the broadband antenna system's summing element, for the purpose of further suppressing the transmit leakage in the receiver system's RF signal input;

wherein a set of cognitive waveforms are generated within said DSP array for transmission from said antenna system and recovery processed within said DSP array for reception from the antenna system, and whereas orthogonal frequency division multiplexed (OFDM) data packets are interleaved with short duration gaps, wherein said data packets are randomly distributed simultaneously over a subset of multiple unoccupied frequencies from an OFDM frequency set, and whereas the combination of the data packets in time and frequency provide a data message, i. said data packets being transmitted and received channels signals activity being monitored simultaneously and continuously so as to maintain rapid response to the changes in the spectral environment;
 ii. said data packets further containing supervisory information and error correction coding, in both time and frequency, to allow for robust message data reception and recovery by users without prior time and frequency synchronization; and,
 iii. said data packets being on subsets of the OFDM frequency set wherein the number of simultaneous packets can be increased to increase the overall message throughput and decreased to respond to currently reduced numbers of unoccupied frequencies.

11. The full-duplex, staring cognitive communications system of claim 10, wherein:
 a) said broadband antenna system comprises at least one broadband receive antenna and at least one broadband transmit antenna, wherein said broadband receive antenna connects to the staring receiver system and said broadband transmit antenna connects to the transmitter system.

12. The full-duplex, staring cognitive communications system of claim 10, wherein:
 a) said digital signal processing (DSP) array, comprises a single DSP array subsystem;
 b) said staring receiver system comprises at least two of said staring receiver subsystems;
 c) said transmitter system comprises at least two of said transmitter subsystems; and,
 d) said broadband antenna system comprises at least one of said broadband antennas, said at least one of said broadband antennas being an antenna subsystem with at least two radiation elements for simultaneous emission and reception,
 said software-defined and staring cognitive communications system having multiple, simultaneous directional emission and/or reception beams capability.

13. The full-duplex, staring cognitive communications system of claim 10, including a digital signal processing, a transmit and a receive capability for multiple simultaneous, arbitrary and software defined signal waveforms, wherein said digital signal processing provides virtual channelization for said arbitrary signals.

14. The full-duplex, staring cognitive communications system of claim 10, wherein:
 a) said digital signal processing (DSP) array, comprises a single DSP array subsystem;
 b) said staring receiver system comprises at least two of said staring receiver subsystems;
 c) said transmitter system comprises at least two of said transmitter subsystems; and,
 d) said broadband antenna system comprises at least one of said broadband antennas, said at least one of said broadband antennas being an antenna subsystem with at least two radiation elements for simultaneous emission and/or reception,
 said software-defined and staring cognitive communications system having multiple, simultaneous directional emission and/or reception beams capability; and,
 said software-defined and staring cognitive communications system having capability for multiple simultaneous, arbitrary and software defined signal waveforms, wherein said digital signal processing array provides virtual channelization for said arbitrary signals.

15. The full-duplex, staring cognitive communications system of claim 10, wherein said broadband antenna system comprises a single radiating element antenna, said staring receiver system comprises one staring receiver subsystem, and said transmitter system comprises one transmitter subsystem.

16. The full-duplex, staring cognitive communications system of claim 10, wherein said broadband antenna system comprises a four radiating element antenna, said staring receiver system comprises four staring receiver subsystems, and said transmitter system comprises four transmitter subsystems.

17. The full-duplex, staring cognitive communications system of claim 10, wherein switched-in frequency up-conversion elements of at least one frequency block are inserted between the transmitter's RF-Power-DAC output port and the isolation element, and between the transmitter's RF-DAC output port and the summing element, and wherein a switched-in frequency down-conversion element of at least one frequency block is inserted between the summing element's output port and the pre-select filter bank element's input port, said frequency conversion blocks allowing higher frequency spectrum, beyond the direct sampled conversion frequency range of the transmitter system and the staring receiver system, to be selectively translated respectively from and to the direct sampled conversion frequency range.

18. The full-duplex, staring cognitive communications system of claim 17, wherein said broadband antenna system comprises a single radiating element antenna, said frequency block frequency translations comprise more than one pair of switched-in frequency up-conversion elements and more than one down-conversion elements, said staring receiver system comprises more than one staring receiver subsystems, and said transmitter system comprises more than one transmitter subsystems, said multiple receiver and transmitter subsystems simultaneously providing multiple frequency block translations and/or subdivision of the required RF frequency coverage.

19. The full-duplex, staring cognitive communications system of claim 17, wherein said broadband antenna system comprises a four radiating element antenna, said frequency block frequency translations comprise four sets of more than one pair of switched-in frequency up-conversion elements and more than one down-conversion elements, said staring receiver system comprises four sets of more than one staring receiver subsystems, and said transmitter system comprises four sets of more than one transmitter subsystems, each set associated respectively with each of the four antenna radiating elements, said multiple receiver and transmitter subsystems simultaneously providing multiple frequency block translations and/or subdivision of the required RF frequency coverage, and said four receiver and transmitter subsystem sets having multiple, simultaneous directional emission and/or reception beams capability.

20. A half-duplex, software-defined and staring cognitive communications system, comprising:
a) a broadband antenna system, comprising:
  i. at least one broadband antenna;
  ii. an antenna interface unit operatively connected to said at least one broadband antenna, said antenna interface unit comprising:
    1. an isolation element operatively connected between a transmitter system and a staring receiver system for supporting short switch times between transmit and receive operations;
    2. a first RF harmonic filter bank operatively connected to said isolation element for providing suppression of transmit signal set harmonics in the RF power output;
    3. a pre-select filter bank for receiving RF signals from said isolation element and for separating and isolating frequency block sets for further signal pre-processing;
b) a staring receiver system operatively connected to said broadband antenna system for viewing and pre-processing input RF signals present in a plurality of channels at the same time, said staring receiver system comprising at least one staring receiver subsystem, said at least one staring receiver subsystem comprising:
  i. at least one block translator operatively switch connected to said pre-select filter bank for providing a frequency translation of a pre-selected frequency block;
  ii. at least one parallel channelization, automated gain control (AGC) and signal detection pre-processor system, each AGC and signal detection pre-processor system comprising:
    1. a fan-out element for replicating said input RF signals into a plurality of pre-process channels along an RF spectral block;
    2. a plurality of pre-process channel miniature RF filters, aligned in parallel, for continuous frequency coverage along said RF spectral block, for separating and isolating a set of comparatively narrow frequency channels on a continuous basis;
    3. a plurality of gain control elements for providing automatic channelized level control, under intelligent process control, of said isolated channels;
    4. a plurality of RF signal detectors for receiving said isolated channels for detecting the presence of signals content, for further determining relative levels, center frequencies, and bandwidths; and,
    5. a fan-in element for combining said plurality of level controlled, isolated channels to a common RF spectrum, thus providing a pre-processed receive RF output;
  iii. a set point summing amplifier for combining said pre-processed receive RF outputs and providing a combined output; and,
  iv. a radio frequency-analog-to-digital converter (RF-ADC) for receiving said combined output and converting it to a digital output,
    wherein said at least one parallel channelization, automated gain control (AGC) and signal detection pre-processor system is configured to allow viewing and conversion of said plurality of channels on a substantially continuous basis without overloading said RF-ADC;
c) a coordinated digital signal processing (DSP) array operatively connected to said staring receiver system for providing digital signal processing of the receive and transmit signal sets, on a real-time basis, as well as management of the software defined and staring cognitive communications system from the digital domain; and,
d) a transmitter system operatively connected to said DSP array and to said broadband antenna system, said transmitter system comprising at least one transmitter subsystem, said at least one transmitter subsystem comprising:
  i. a radio frequency-digital-to-analog converter (RF-DAC) for receiving at least one modulated RF signal from said DSP array, said at least one modulated RF signal having independent modulation from the other modulated RF signals for simultaneous transmission;
  ii. a second RF harmonic filter bank operatively connected to said RF-DAC for the suppression of sampling process artifacts, including signals harmonics;
  iii. an RF pre-amp system operatively connected to said second RF harmonic filter bank for the linear amplification of the RF signals to a working level for an RF power amplifier;
  iv. at least one block translator system operatively connected to said RF pre-amp system for providing a frequency translation of a pre-amplified frequency block to a final frequency band; and,
  v. an RF power amplifier for linearly amplifying pre-amplified frequency blocks with transmit signal content from the pre-amp system, as well as translated frequency blocks with transmit signal content from said block translators.

21. A full-duplex, staring cognitive communications system, comprising:
a) a broadband antenna system, comprising:
  i. at least one broadband antenna;
  ii. an antenna interface unit operatively connected to said at least one broadband antenna, said antenna interface unit comprising:
    1. an isolation element operatively connected between a transmitter system and a staring receiver system for partial suppression of transmit to receive signal leakage during simultaneous transmit and receive operations;
    2. a summing element operatively connected between an output port of said isolation element, an output port of a low power radio frequency-digital-to-analog converter (RF-DAC) of the transmitter system, and an input port of a pre-select filter bank element for additional suppression of transmit to receive signal leakage during simultaneous transmit and receive operations, said signal leakage suppression resulting from a controlled combining of the low power DAC signal output with a receive signal output of said isolation element;
    3. said pre-select filter bank element being operatively connected between the isolation element's output port and an input port of the staring receiver, for receiving RF signals from said summing element and for separating and isolating frequency block sets for further signal pre-processing in the staring receiver system;
b) a staring receiver system operatively connected to said broadband antenna system for viewing and pre-processing input RF signals present in a plurality of channels at the same time, said staring receiver system comprising at least one staring receiver subsystem, said at least one staring receiver subsystem comprising:

i. at least one parallel channelization, automated gain control (AGC) and signal detection pre-processor system, each AGC and signal detection pre-processor system comprising:
  1. a fan-out element for replicating said input RF signals into a plurality of pre-process channels along an RF spectral block;
  2. a plurality of pre-process channel miniature RF filters, aligned in parallel, for continuous frequency coverage along said RF spectral block, for separating and isolating a set of comparatively narrow frequency channels on a continuous basis;
  3. a plurality of gain control elements for providing automatic channelized level control, under intelligent process control, of said isolated channels;
  4. a plurality of RF signal detectors for receiving said isolated channels for detecting the presence of signals content, for further determining relative levels, center frequencies, and bandwidths; and,
  5. a fan-in element for combining said plurality of level controlled, isolated channels to a common RF spectrum, thus providing a pre-processed receive RF output;
ii. a set point summing amplifier for combining said pre-processed receive RF outputs and providing a combined output; and,
iii. a radio frequency-analog-to-digital converter (RF-ADC) for receiving said combined output and converting it to a digital output,
  wherein said at least one parallel channelization, automated gain control (AGC) and signal detection pre-processor system is configured to allow viewing and conversion of said plurality of channels on a substantially continuous basis without overloading said RF-ADC;
c) a coordinated digital signal processing (DSP) array operatively connected to said staring receiver system for providing digital signal processing of the receive and transmit signal sets, on a real-time basis, as well as management of the software defined and staring cognitive communications system from the digital domain; and,
d) a transmitter system operatively connected to said DSP array and to said broadband antenna system, said transmitter system comprising at least one transmitter subsystem, said at least one transmitter subsystem comprising:
  i. a radio frequency-power output-digital-to-analog converter (RF-Power-DAC) for receiving at least one modulated RF signal from said DSP array, said at least one modulated RF signal having independent modulation from the other modulated RF signals for simultaneous transmission, said RF-Power-DAC having output analog filtering to adequately suppress sampling signal artifacts from above the first Nyquist band;
  ii. a low power radio frequency-digital-to-analog converter (RF-DAC) for receiving at least one modulated RF signal from said DSP array, said at least one modulated RF signal being negatively matched to the transmit leakage signal at the broadband antenna system's summing element, for the purpose of further suppressing the transmit leakage in the receiver system's RF signal input.

* * * * *